United States Patent
Prosyk et al.

(10) Patent No.: US 9,182,546 B2
(45) Date of Patent: Nov. 10, 2015

(54) MONOLITHIC OPTOELECTRONIC TWE-COMPONENT STRUCTURE FOR HIGH FREQUENCIES AND LOW OPTICAL INSERTION LOSS

(75) Inventors: Kelvin Prosyk, Luskville (CA); Ronald Kaiser, Berlin (DE); Karl-Otto Velthaus, Kleinmachnow (DE)

(73) Assignees: Fraunhofer-Gesellschaft Zur Forderung Der Angewandten Forschung E.V., Munich (DE); Teraxion Inc., Quebec (CA)

( * ) Notice: Subject to any disclaimer, the term of this patent is extended or adjusted under 35 U.S.C. 154(b) by 0 days.

(21) Appl. No.: 12/638,372

(22) Filed: Dec. 15, 2009

(65) Prior Publication Data
US 2010/0150494 A1   Jun. 17, 2010

Related U.S. Application Data

(60) Provisional application No. 61/122,909, filed on Dec. 16, 2008.

(51) Int. Cl.
| | | |
|---|---|---|
| *G02B 6/26* | (2006.01) | |
| *G02B 6/42* | (2006.01) | |
| *G02B 6/122* | (2006.01) | |
| *G02B 6/30* | (2006.01) | |

(52) U.S. Cl.
CPC .............. *G02B 6/1228* (2013.01); *G02B 6/305* (2013.01)

(58) Field of Classification Search
CPC ...................................................... G02B 6/1228
See application file for complete search history.

(56) References Cited

U.S. PATENT DOCUMENTS

| | | | |
|---|---|---|---|
| 5,799,119 A * | 8/1998 | Rolland et al. ............... | 385/28 |
| 6,058,226 A | 5/2000 | Starodubov | |
| 6,122,416 A | 9/2000 | Ooba et al. | |
| 6,198,854 B1 | 3/2001 | Takagi | |
| 6,411,764 B1 | 6/2002 | Lee | |
| 2002/0038900 A1 | 4/2002 | Yamauchi | |
| 2003/0081900 A1 * | 5/2003 | Nashimoto ................ | 385/43 |
| 2003/0081922 A1 * | 5/2003 | Ide ............................. | 385/129 |
| 2005/0095012 A1 | 5/2005 | Watanabe | |

FOREIGN PATENT DOCUMENTS

| | | | |
|---|---|---|---|
| JP | 2000101186 A | 4/2000 | |
| JP | 2001174658 A | 6/2001 | |
| JP | 2002107681 A | 4/2002 | |

OTHER PUBLICATIONS

R. A. Griffin et al., Compact, High Power, MQW InP Mach-Zehnder Transmitters with Full-band Tunability for 10 Gb/s DWDM, ECOC, Sep. 2005, pp. 903-904, vol. 4, Canada.

K. Prosyk et al., Low Loss, Low Chirp, Low Voltage, Polarization Independent 40Gb/s Bulk Electro-Absorption Modulator Module, OFC, Mar. 2003, pp. 269-270, vol. 1, U.S.A.

(Continued)

*Primary Examiner* — Uyen Chau N Le
*Assistant Examiner* — Chad Smith
(74) *Attorney, Agent, or Firm* — Hovey Williams LLP

(57) ABSTRACT

A monolithic optoelectronic device has a spot-size converter optically connected to a waveguide. The overclad extending over the core of the waveguide is thinner and more highly doped that the overclad of the spot-size converter. This structure can be made by applying a process of selective etching and enhanced regrowth to create selective regions of the overclad of different thickness or doping.

6 Claims, 5 Drawing Sheets

(56) References Cited

OTHER PUBLICATIONS

I. Betty et al., An Empirical Model for High Yield Manufacturing of 10Gb/s Negative Chirp InP Mach-Zehnder Modulators, OFC, Mar. 2005, 3 pages, vol. 3, Canada.

D. Hoffmann et al., 45 Ghz Bandwidth Travelling Wave Electrode Mach-Zehnder Modulator with Integrated Spot Size Converter, 2004 International Conference on Indium Phoshide and Related Materials Conference Proceedings, May 2004, pp. 585-588.

H. N. Klein et al., 1.55µm Mach-Zehnder Modulators on InP for optical 40/80 Gbit/s transmission networks, InP and Related Materials Conference, May 2006, pp. 171-173.

* cited by examiner

MONOLITHIC OPTOELECTRONIC TWE-COMPONENT STRUCTURE FOR HIGH FREQUENCIES AND LOW OPTICAL INSERTION LOSS

RELATED APPLICATION

The present application is based on and claims priority to the Applicant's U.S. Provisional Patent Application 61/122,909, entitled "Monolithic Optoelectronic TWE-Component Structure For High Frequencies And Low Optical Insertion Loss," filed on Dec. 16, 2008.

BACKGROUND OF THE INVENTION

1. Field of the Invention.

The present invention relates generally to the field of photonic devices. More specifically, the present invention discloses a monolithic optoelectronic TWE-component structure providing low insertion loss for high-speed optical signal transmission.

2. Statement of the Problem.

Low cost, small size, and high-performance indium phosphide (InP) based Mach-Zehnder modulators (MZMs) are widely known in the fiber optics photonic component industry. Two challenges exist that limit MZM performance: optical insertion loss and baud rate.

Optical insertion loss is defined as the power of the light coming out of the device divided by the power of the light injected into the device, usually expressed as the negative of the value in decibels (dB). The coupling of light onto and off of the chip usually involves bulk optical components and/or optical fiber waveguides, which have limitations on how small the light beam can be focused. On the chip, the light is guided by semiconductor epitaxial layers and photo-lithographically defined waveguides. For practical and cost reasons, the light beam on the chip has limitations on how large its diameter can be. This mismatch between the large off-chip beam and small on-chip beam gives rise to a coupling loss and is the major contributor to high loss in InP-based MZMs specifically and photonic devices in general. Coupling losses can be up to 4 dB or more for each of the input and output.

The baud rate of an MZM is limited by its radio frequency (RF) bandwidth. In an InP MZM, an electrical signal is applied to an electrode, which consequently switches the modulator between optical states. The bandwidth of the MZM is limited by the capacitance or impedance of the electrode, and the matching between the velocity of the optical wave and the electrical wave. A typical baud rate for an MZM with industrially acceptable performance is 10 GBd.

Both optical insertion loss problem and the baud rate problem have been solved separately. For insertion loss, a spot-size converter (SSC) has been developed which allows the size of the light beam on the semiconductor chip to expand to a size which is matched to off-chip bulk optics, improving the coupling loss to 0.8 dB. FIG. 1 shows a prior-art SSC 10 having a large mode 11 at the chip facet for coupling to bulk optics, and a small mode 12 at the end suitable for use on the chip. Note that the facet mode is present all the way to the top of the semiconductor. Note also that the prior art SSC 10 shown in FIG. 1 uses a selective etching and enhanced regrowth procedure to produce a core which varies in thickness in order to reduce the size of the mode as it propagates in the z direction. However in the prior art, the overclad above the core is of substantially uniform thickness. The SSC has been monolithically integrated with a MZM chip.

For the baud rate problem, a travelling wave electrode design has been developed which eliminates the capacitance and velocity matching limitation of the electrode. FIG. 2 is a plan view schematic of prior art travelling wave electrodes on a MZM 20. The black lines indicate, from left to right, an input waveguide 21, a splitting device 22, two MZ waveguides 23 and 24 in parallel, a combining device 25, and an output waveguide 26. The large grey areas indicate the travelling wave electrode 27 which periodically makes contact to the waveguides using t-shaped branches. Baud rates of 40 GBd have been demonstrated and a capability of extending the baud rate to 80 GBd has also been shown.

FIG. 3 is a cross-sectional view through the x-y plane in the MZ waveguide electrode region of the prior art SSC MZM 10 (left), and the prior art travelling wave MZM 20 (right). The layer with the horizontal lines indicates the semiconductor waveguide core 31. The dark grey layer on top indicates the metal of the electrode 32. In between the waveguide core 31 and the electrode 32 is a semiconductor layer 33. In the SSC MZM 10, this layer 33 must be thick to accommodate the large facet mode (as in FIG. 1), and lightly doped to minimize optical loss. In the travelling wave MZM 20, the layer 33 must be thin and highly doped to minimize RF loss.

Despite these separate advances in InP MZM technology, however, it has not been possible to integrate both improvements to simultaneously achieve both low insertion loss and high baud rate. There are two fundamental incompatibilities that are responsible. First, the travelling wave electrode requires that the layer of semiconductor material (referred to as the "overclad") between the metal of the electrode on top and the guiding core underneath to be as thin as possible, in order to minimize RF loss. Contrarily, the SSC requires the overclad to be thick in order to allow the on-chip optical beam to expand sufficiently to match the bulk off-chip optics.

Second, the travelling wave electrode requires that the overclad be doped sufficiently to provide a highly conducting material to minimize the resistance. Contrarily, the SSC requires a low-doped or undoped overclad, since doped material (especially p-type doping) induces significant optical losses. These are hereafter referred to as the first and second incompatibilities, respectively.

3. Solution To The Problem.

The present invention addresses the two fundamental incompatibilities discussed above that have heretofore prevented the monolithic integration of an SSC and conventional travelling wave photonic devices, without sacrificing the benefits of each. In particular, the present invention employs a process of selective etching and enhanced regrowth (SEER) to create an overclad layer that is both: (1) thicker in the SSC region; and (2) highly doped in the travelling wave region of the device and undoped in the SSC region.

SUMMARY OF THE INVENTION

This invention provides a monolithic optoelectronic device having a spot-size converter optically connected to a waveguide. The overclad extending over the core of the waveguide is thinner and more highly doped that the overclad of the spot-size converter. This structure can be made by applying a process of selective etching and enhanced regrowth to selective regions of the overclad.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Application of a judiciously-shaped mask of silicon oxide or other material to the surface of a semiconductor wafer followed by subsequent epitaxial growth can cause the thickness of the grown epitaxial layers to vary across the wafer. We refer to this technique as enhanced selective area growth (ESAG). The waveguide core can first be grown over the entire wafer, then a mask applied to achieve ESAG of the subsequently-grown overclad. By arranging ESAG such that the overclad is thicker in the region of a SSC, and thinner in the region of the MZM electrodes, the first incompatibility between the simultaneous need for a thick overclad of a SSC and a thin overclad of MZM electrodes can be resolved.

It is a commonly-used technique to apply photoresist, silicon oxide, or other material to create a mask on the surface of the wafer that allows etching in selected areas, a procedure we refer to as SE (selective etch). Furthermore, the same mask or another mask applied after the etching procedure can be used during epitaxial growth to ensure that only selected areas have material grown on them. Areas covered by the mask receive no crystal growth. The mask may or may not be shaped to enhance the growth in some areas. If the mask is shaped such that growth is not enhanced, the layer grown will be of substantially uniform thickness across the whole wafer, except for those areas that receive no growth at all. We refer to this as (non-enhanced) selective area growth, or SAG. It is often desirable to first perform a SE, then follow it by a SAG step, where the SAG steps acts to fill in some or all of the material that was removed during the selective etch. Areas that were not etched may be substantially covered by the mask so as to receive no growth at all. In fact, it is common to use the same mask for both the SE step and the SAG step, thereby etching away material in selected areas on the wafer and replacing only these etched areas with another material. We refer to this combination of SE followed by SAG as selective etch and regrowth (SER).

By applying an SER process to the overclad layer, a combination of highly-doped regions and undoped regions can be simultaneously achieved, which resolves the second incompatibility between the simultaneous need for a high doped/high conducting overclad for the travelling wave MZM, and a low-doped overclad for the SSC MZM. The procedure is as follows. First, grow a highly-doped overclad over the entire wafer. Second, place a mask on the wafer such that all areas of the overclad except those waveguide areas requiring electrical contact to a metal electrode are exposed. In other words, those areas of the overclad that will be used to form electrodes are covered by the mask. Third, etch away a substantial portion of the overclad in the exposed areas using SE. Finally, selectively fill in the etched portions with semiconductor material that is less highly doped (e.g., undoped semiconductor material) using SAG.

Figure 1:
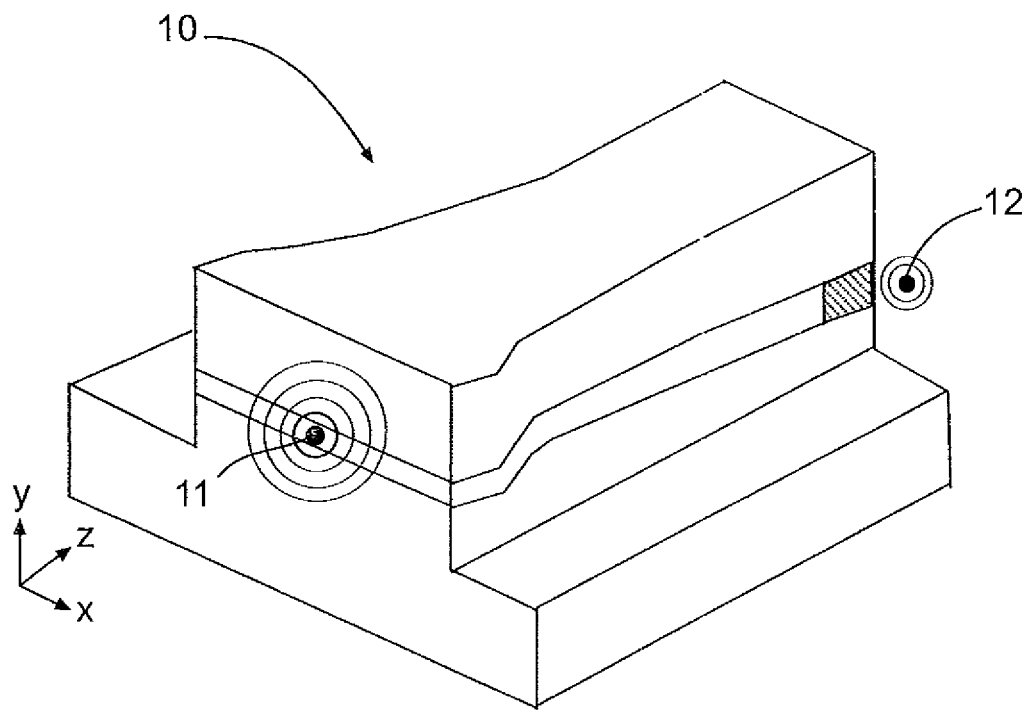
FIG. 1 shows a prior art SSC 10 having a large mode at the chip facet for coupling to bulk optics, and a small mode at the end suitable for use on the chip.
Figure 2:
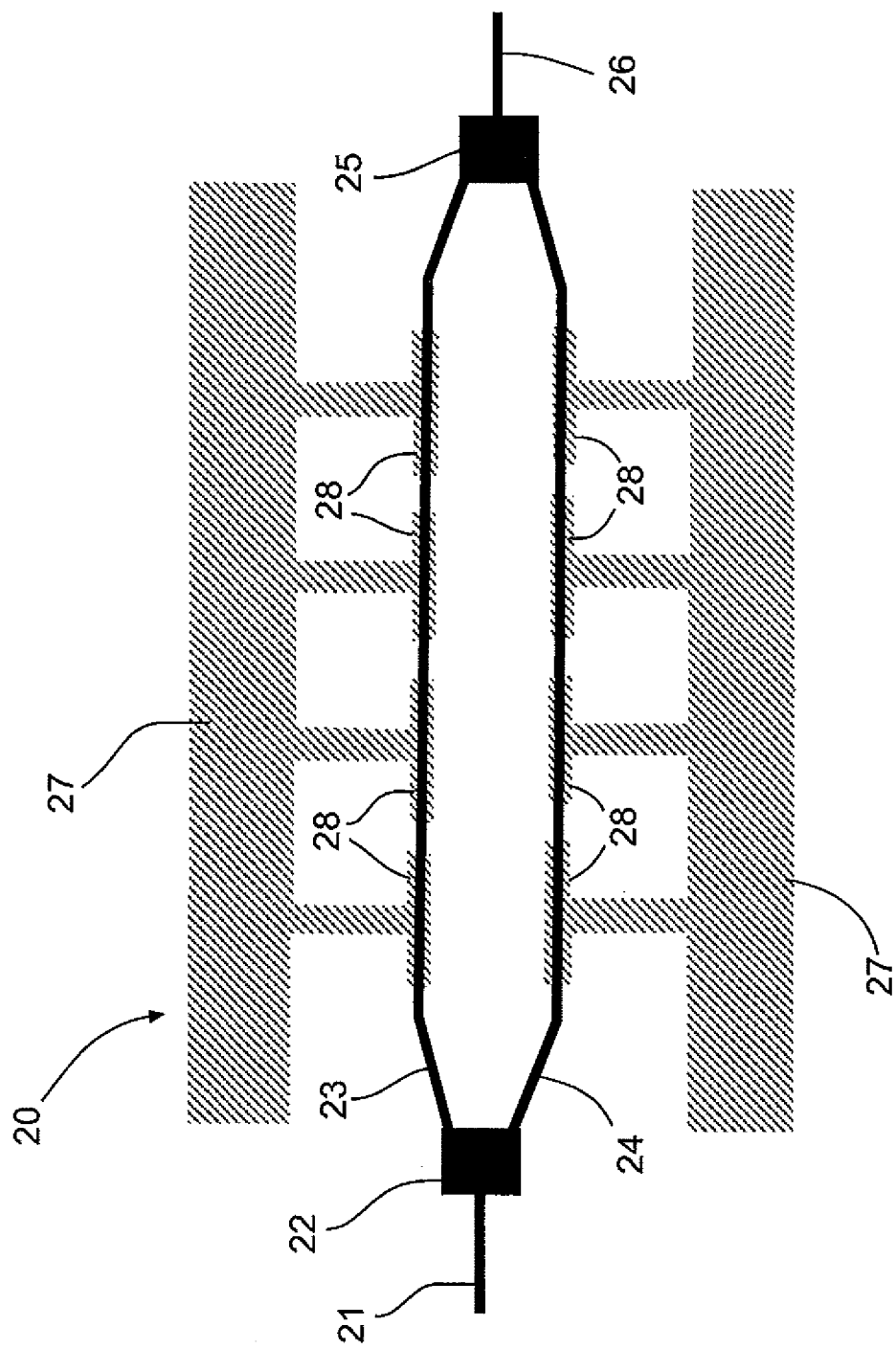
FIG. 2 is a plan view schematic of prior art travelling wave electrodes on a MZM 20.
Figure 3:
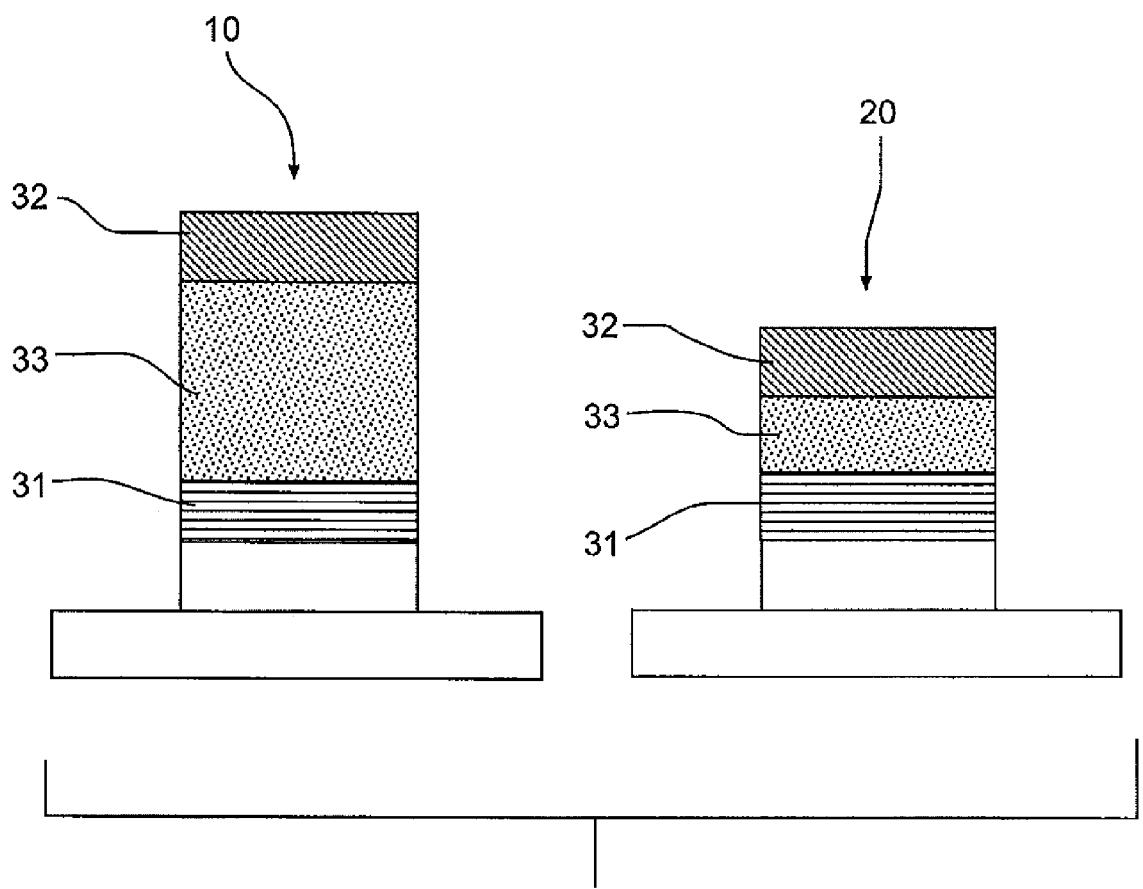
FIG. 3 is a cross-sectional view through the x-y plane in the MZ waveguide electrode region of the prior art SSC MZM 10 (left), and the prior art travelling wave MZM 20 (right).
Figure 4:
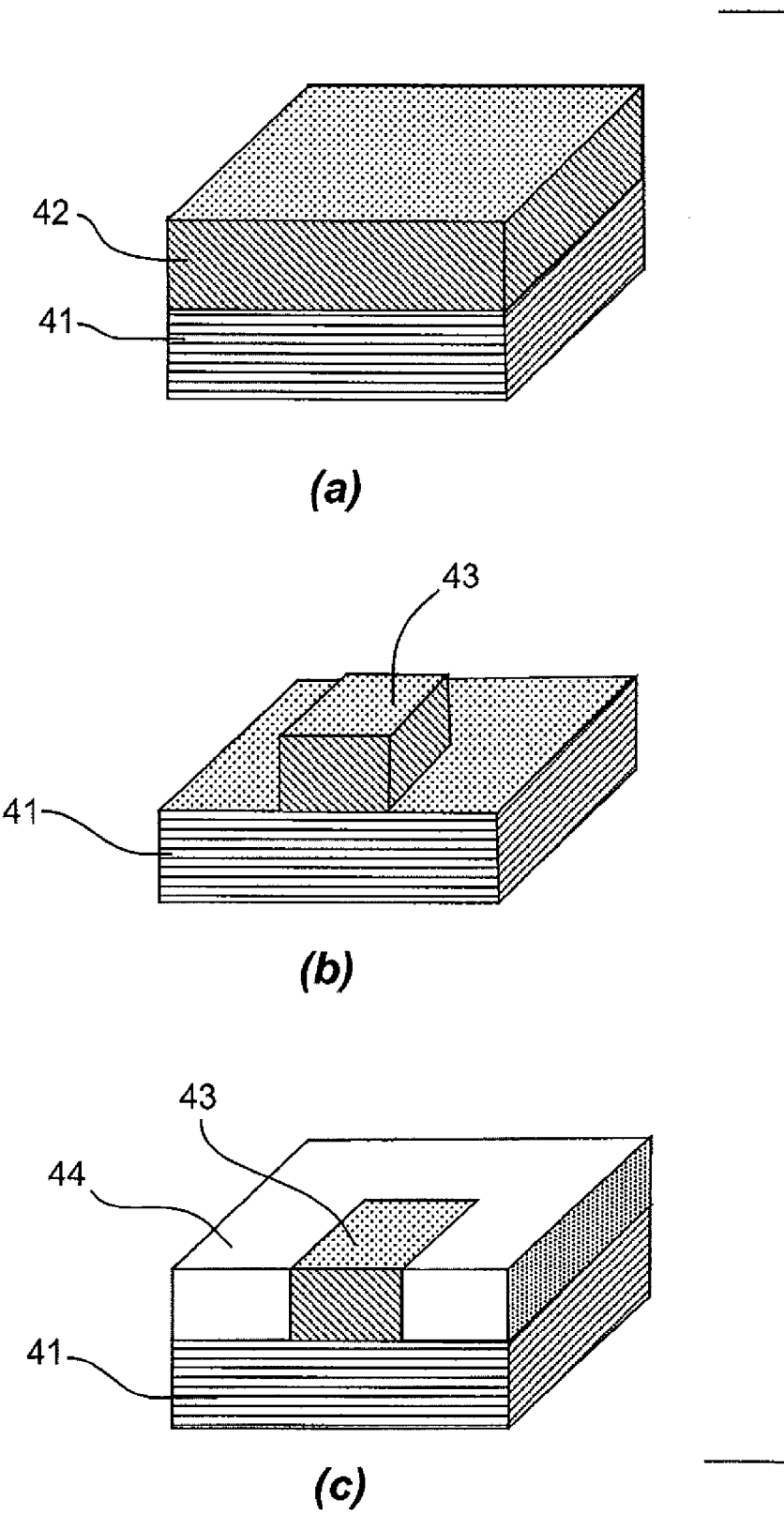
FIGS. 4(a)-4(c) are schematic examples of the steps in the selective etch and regrowth (SER) process.

FIGS. 4(a)-4(c) are schematic examples of the steps in the SER procedure. In FIG. 4(a), the lower layer indicates the waveguide core 41, and the upper layer 42 indicates highly-doped InP (etch mask not shown). In FIG. 4(b), the highly-doped InP has been etched away except for an isolated island 43. Eventually, a metal electrode will be placed on this island 43 to apply electrical signal to the core below. In FIG. 4(c), the highly-doped InP which has been etched away has selectively been replaced by undoped InP 44. In the case of SER, the re-grown InP 44 is of substantially uniform thickness. Metal electrodes can then be formed on the unetched areas of the overclad (i.e., island 43).

The preceding paragraphs describe how to separately overcome each of the first and second incompatibilities listed above. If one or the other is used, some or most of the benefits of SSC and travelling wave electrodes could be simultaneously realized. Further improvement, however, may be achieved by resolving both the first and second incompatibilities on the same chip. This can be accomplished as follows. The ER procedure described to resolve the second incompatibility is applied with one change. Instead of using SAG, ESAG is used. We refer to this as selective etch and enhanced regrowth (SEER). The mask is designed such that the enhanced thickness of the overclad occurs in the region of the SSC. A transition will be present between the SSC and the MZM in the z direction where the overclad thickness decreases from the enhanced thickness to the unenhanced thickness. Thus both thick and thin overclads, and highly doped and undoped overclads are all simultaneously and advantageously achieved on the same MZM chip with one or many SSCs and one or many electrodes.

Modifications to the procedure used to fabricate the preferred embodiment outlined above will be clear to those skilled in the art. For example, the ESAG step in the SEER procedure may not necessarily use the same mask as the SE step. The mask used for the ESAG step may be such that all areas etched are not filled, or crystal growth occurs in areas not etched. Some areas of enhanced growth may be desired in areas not coinciding with the SSC, or regions of highly doped overclad may be left which do not coincide with electrodes. The electrodes may not be of the travelling wave variety, but instead a single electrode. The SEER procedure can readily be combined with other fabrication procedures.

Figure 5:
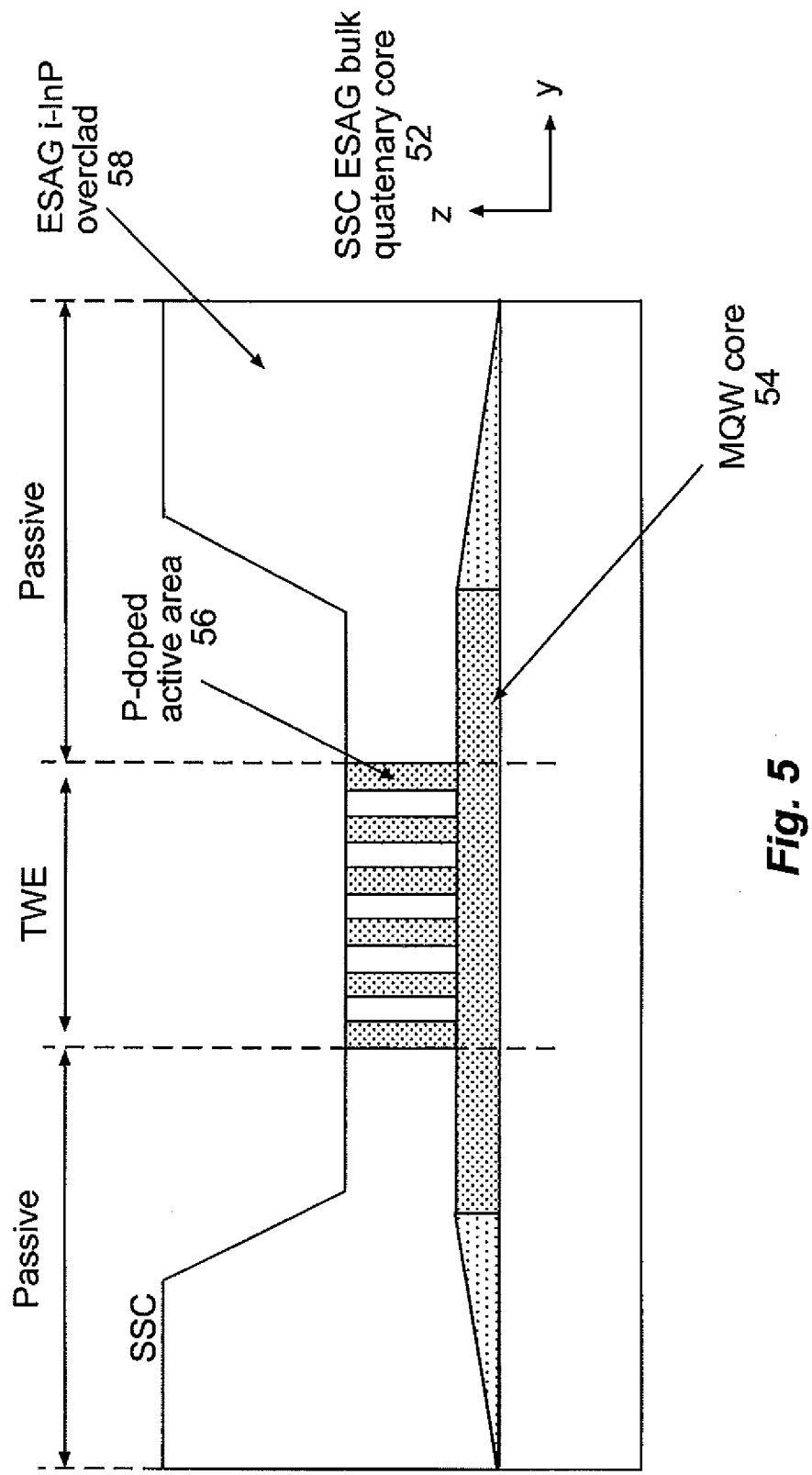
FIG. 5 is a side cross-sectional view of a photonic device embodying the present invention.

FIG. 5 is a side cross-section schematic of an embodiment of the present invention. The diagram shows the prior art SSC which uses an ESAG bulk quaternary core 52 formed butt jointed to a MQW core 54 using a SEER process. The diagram also shows a series of p-doped active channels 56 used to form a travelling wave electrode. Finally, the overclad 58 can be seen to be thin in the vicinity of the travelling wave electrode and thick in the vicinity of the SSC, as described by this invention.

Although a preferred embodiment of the present invention is an InP MZM with travelling wave electrodes, it is not constrained to such a device, nor is it constrained to the InP/InGaAsP material system. It will be clear to practitioners skilled in the art that a monolithically-integrated combination of low coupling loss and high bandwidth can be advantageously applied to a broad range of photonic devices that involve (i) light which must be efficiently coupled on and/or off chip; and (ii) one or more RE electrodes. Devices include but are not limited to lasers, electro-absorption modulators, photo-detectors, and modulators intended for quadrature phase-shift keying, which involve two MZMs each of which are embedded in the arm of a Mach-Zehnder interferometer. Semiconductor materials include but are not limited to Si, SiGe, InP/InAlGaAs, GaAs/AlGaAs.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A monolithic optoelectronic device comprising:
   a Mach-Zehnder modulator comprising an optical waveguide containing a core and at least one electrode connected to at least a portion of the waveguide;
   a spot-size converter optically connected to the waveguide and containing a core; and
   an overclad structure comprising a thick overclad having an enhanced thickness extending over the core of the spot-size converter, a thin overclad having an unenhanced thickness extending over the core of the waveguide, and a transition between the spot-size converter and the waveguide where the thickness of the overclad structure decreases from the enhanced thickness to the unenhanced thickness, wherein the thin overclad over the waveguide is more highly doped than the thick overclad over the spot-size converter.

2. The monolithic optoelectronic device of claim 1, wherein the at least one electrode comprises a traveling wave electrode.

3. The monolithic optoelectronic device of claim 1, wherein the overclad of the waveguide and spot-size converter are made by a process of selective etching and regrowth to selectively create areas of different doping.

4. The monolithic optoelectronic device of claim 1, wherein the at least one electrode extends on the thin overclad over the waveguide.

5. The monolithic optoelectronic device of claim 1, wherein the thin overclad of the waveguide comprises a series of p-doped channels.

6. The monolithic optoelectronic device of claim 1, wherein the core of the spot-size converter is made of a different material than the core of the waveguide.

* * * * *